US012775268B2

(12) United States Patent
Kang et al.

(10) Patent No.: US 12,775,268 B2
(45) **Date of Patent: *Oct. 27, 2026**

(54) SIMULATION METHOD AND APPARATUS FOR SECONDARY BATTERY PRODUCTION

(71) Applicant: LG ENERGY SOLUTION, LTD., Seoul (KR)

(72) Inventors: Shinkyu Kang, Daejeon (KR); Min Yong Kim, Daejeon (KR); Youngduk Kim, Daejeon (KR); Nam Hyuck Kim, Daejeon (KR); Su Ho Jeon, Daejeon (KR); Min Hee Kwon, Daejeon (KR); Sung Nam Cho, Daejeon (KR); Hyeong Geun Chae, Daejeon (KR); Gyeong Yun Jo, Daejeon (KR); Moon Kyu Jo, Daejeon (KR); Kyungchul Hwang, Daejeon (KR); Moo Hyun Yoo, Daejeon (KR); Han Seung Kim, Daejeon (KR); Daewoon Jung, Daejeon (KR); Seungtae Kim, Daejeon (KR); Junhyeok Jeon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 582 days.

This patent is subject to a terminal disclaimer.

(21) Appl. No.: 18/272,552

(22) PCT Filed: Jul. 14, 2022

(86) PCT No.: PCT/KR2022/010307

§ 371 (c)(1),
(2) Date: Jul. 14, 2023

(87) PCT Pub. No.: WO2023/075085

PCT Pub. Date: May 4, 2023

(65) Prior Publication Data

US 2024/0069535 A1 Feb. 29, 2024

(30) Foreign Application Priority Data

Nov. 1, 2021 (KR) ........................ 10-2021-0147988

(51) Int. Cl.
*G05B 19/418* (2006.01)
*G05B 19/4099* (2006.01)

(52) U.S. Cl.
CPC ... *G05B 19/41875* (2013.01); *G05B 19/4099* (2013.01); *G05B 19/4184* (2013.01)

(58) Field of Classification Search
CPC .......... G05B 19/41875; G05B 19/4099; G05B 19/4184; G05B 19/41885;
(Continued)

(56) References Cited

U.S. PATENT DOCUMENTS

2017/0025040 A1* 1/2017 Maturana ................. G06N 5/04
2020/0203712 A1 6/2020 Park et al.
2021/0075706 A1* 3/2021 Wang .................... H04L 43/065

FOREIGN PATENT DOCUMENTS

CN 105190724 A 12/2015
CN 107229343 A * 10/2017 ............... G09B 9/00
(Continued)

*Primary Examiner* — Kamini S Shah
*Assistant Examiner* — Michael Tang
(74) *Attorney, Agent, or Firm* — Bryan Cave Leighton Paisner LLP

(57) ABSTRACT

The present disclosure relates to a simulation apparatus for secondary battery production. According to one embodiment of the present disclosure, a simulation method for secondary battery production performed by at least one processor includes: executing an apparatus operating unit including a 3D model apparatus related to secondary battery production, a facility operating unit including a plurality of adjustment parameters for determining operation of the 3D model apparatus, and a quality checking unit including quality information related to quality of a material produced by the
(Continued)

3D model apparatus, receiving at least one of first user action information obtained through the apparatus operating unit or first user condition information obtained through the facility operating unit, determining an operation of the 3D model apparatus based on at least one of the first user action information or the first user condition information obtained, and executing the operation of the 3D model apparatus included in the apparatus operating unit based on the determined operation.

15 Claims, 12 Drawing Sheets

(58) Field of Classification Search
CPC ...... G05B 2219/32368; G05B 23/0294; G05B 23/02; G09B 19/003; G09B 19/0069; H01M 10/04; H01M 4/04; H01M 4/0404; G06T 17/00; Y02P 90/02
USPC .......................................................... 700/109
See application file for complete search history.

(56) References Cited

FOREIGN PATENT DOCUMENTS

| | | | | | |
|---|---|---|---|---|---|
| CN | 113377028 | A | 9/2021 | | |
| EP | 4276449 | A1 | 11/2023 | | |
| JP | 2001-232265 | A | 8/2001 | | |
| JP | 2020-184419 | A | 11/2020 | | |
| KR | 10-1214769 | B1 | 12/2012 | | |
| KR | 10-2013-0122408 | A | 11/2013 | | |
| KR | 10-1644462 | B1 | 8/2016 | | |
| KR | 10-1675348 | B1 | 11/2016 | | |
| KR | 101809199 | B1 | 12/2017 | | |
| KR | 10-2019-0026115 | A | 3/2019 | | |
| KR | 10-1933533 | B1 | 4/2019 | | |
| KR | 10-2019-0048862 | A | 5/2019 | | |
| WO | WO-2014140720 | A1 * | 9/2014 | ............. | G09B 19/24 |

* cited by examiner

SIMULATION METHOD AND APPARATUS FOR SECONDARY BATTERY PRODUCTION

CROSS-REFERENCE TO RELATED APPLICATION

This application is a National Phase entry pursuant to 35 U.S.C. 371 of International Application No. PCT/KR2022/010307 filed on Jul. 14, 2022, which claims priority to and the benefit of Korean Patent Application No. 10-2021-0147988 filed on Nov. 1, 2021, the disclosure of which is incorporated herein by reference in its entirety.

TECHNICAL FIELD

The present disclosure relates to a simulation method and apparatus for secondary battery production and, more specifically, to a simulation method and apparatus for training secondary battery production workers.

BACKGROUND

Due to the recent growth of the electric vehicle market, the demand for developing and producing secondary batteries is rapidly increasing. The number of production plants for secondary battery production is also growing in response to the increase in demand for secondary batteries. However, the industry is experiencing a significant shortage of skilled workers for operating secondary battery production plants.

Meanwhile, in the past, training and education of new workers were carried out in such a way of learning a skill by watching experienced workers, but it became difficult to train and educate new workers for a long time due to the busy production schedule of secondary batteries. In addition, it is difficult to find a sufficient number of skilled workers due to the frequent resignation of workers. Also, even if a worker is trained in a general method of operating a factory, it is not easy for the worker to immediately respond to various defect situations that may occur during factory operation.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

To solve the problem above, the present disclosure provides a simulation method for secondary battery production, a computer program stored in a computer-readable medium, a computer-readable medium storing the computer program, and an apparatus (system).

The present disclosure may be implemented in various ways including an apparatus (system), a computer program stored in a computer-readable medium, or a computer-readable medium storing the computer program.

According to one embodiment of the present disclosure, a simulation method for secondary battery production performed by at least one processor includes: executing an apparatus operating unit including a 3D model apparatus related to secondary battery production, a facility operating unit including a plurality of adjustment parameters for determining operation of the 3D model apparatus, and a quality checking unit including quality information related to quality of a material produced by the 3D model apparatus, receiving at least one of first user action information obtained through the apparatus operating unit or first user condition information obtained through the facility operating unit, determining an operation of the 3D model apparatus based on at least one of the first user action information or the first user condition information obtained, and executing the operation of the 3D model apparatus included in the apparatus operating unit based on the determined operation.

According to one embodiment of the present disclosure, the method may further include determining, when the first user action information is received, whether the received first user action information corresponds to a predetermined operating condition of the 3D model apparatus, and approving the operation of the 3D model apparatus when it is determined that the first user action information corresponds to the predetermined operating condition of the 3D model apparatus.

According to one embodiment of the present disclosure, the method may further include determining one or more quality parameters for determining the quality of the material produced by the 3D model apparatus; calculating a value corresponding to each of the determined one or more quality parameters based on the operation of the 3D model apparatus being executed while the operation of the 3D model apparatus is in execution; and generating quality information related to the quality of the material produced by the 3D model apparatus based on the calculated value corresponding to each of the one or more quality parameters.

According to one embodiment of the present disclosure, the method may further include determining one or more defect scenarios among a plurality of defect scenarios related to malfunction of the 3D model apparatus; and modifying at least one of the operation of the 3D model apparatus or the quality information related to the quality of the material based on the determined one or more defect scenarios.

According to one embodiment of the present disclosure, the method may further include receiving at least one of second user action information obtained through the apparatus operating unit or second user condition information obtained through the facility operating unit for resolving the determined one or more defect scenarios; correcting the modified operation of the 3D model apparatus based on at least one of the received second user action information or the received second user condition information; calculating a value corresponding to each of one or more quality parameters related to the quality of the material produced by the 3D model apparatus based on the operation of the 3D model apparatus being executed, while the corrected operation of the 3D model apparatus is in execution; correcting the quality information related to the quality of the material produced by the corrected 3D model apparatus based on the calculated value corresponding to each of the one or more quality parameters; and determining whether the one or more defect scenarios are resolved based on the corrected quality information.

According to one embodiment of the present disclosure, the method may further include: upon determining that the one or more derect scenarios are resolved, calculating a progress time and a loss value of the one or more defect scenarios while the one or more defect scenarios are in progress; and generating operational capability information of a user account for the 3D model apparatus based on the calculated progress time and loss value.

According to one embodiment of the present disclosure, the method may further include outputting guide information including condition information and action information required to resolve the one or more defect scenarios.

According to one embodiment of the present disclosure, the method may further include obtaining, when a malfunction occurs in an external device associated with the 3D model apparatus, error information related to the malfunction; and generating a defect scenario related to the malfunction of the 3D model apparatus based on the obtained error information.

According to one embodiment of the present disclosure, the first user condition information may include information associated with a value corresponding to at least one adjustment parameter included in the plurality of adjustment parameters.

A non-transitory computer-readable medium storing instructions for executing a silmulation for secondary battery production is provided to execute the method according to one embodiment of the present disclosure in a computer.

A simulation apparatus for secondary battery production according to one embodiment of the present disclosure includes a memory configured to store at least one instruction; and at least one processor configured to execute the at least one instruction stored in the memory to perform operations including: executing an apparatus operating unit including a 3D model apparatus related to secondary battery production, a facility operating unit including a plurality of adjustment parameters for determining operation of the 3D model apparatus, and a quality checking unit including quality information related to quality of a material produced by the 3D model apparatus, receiving at least one of first user action information obtained through the apparatus operating unit or first user condition information obtained through the facility operating unit, determining operation of the 3D model apparatus based on at least one of the first user action information or the first user condition information obtained, and executing the operation of the 3D model apparatus included in the apparatus operating unit based on the determined operation.

According to one embodiment of the present disclosure, the operations may further include: determining, when the first user action information is received, whether the received first user action information corresponds to a predetermined operating condition of the 3D model apparatus, and approving the operation of the 3D model apparatus when it is determined that the first user action information corresponds to the predetermined operating condition of the 3D model apparatus.

According to one embodiment of the present disclosure, the operations may further include: determining one or more quality parameters for determining the quality of the material produced by the 3D model apparatus; calculating a value corresponding to each of the determined one or more quality parameters based on the operation of the 3D model apparatus being executed while the operation of the 3D model apparatus is in execution; and generating quality information related to the quality of the material produced by the 3D model apparatus based on the calculated value corresponding to each of the one or more quality parameters.

According to one embodiment of the present disclosure, the operations may further include: determining one or more defect scenarios among a plurality of defect scenarios related to malfunction of the 3D model apparatus; and modifying at least one of the operation of the 3D model apparatus and the quality information related to the quality of the material based on the determined one or more defect scenarios.

According to one embodiment of the present disclosure, the operations may further include: receiving at least one of second user action information obtained through the apparatus operating unit or second user condition information obtained through the facility operating unit for resolving the determined one or more defect scenarios; correcting the modified operation of the 3D model apparatus based on at least one of the received second user action information or the received second user condition information; calculating a value corresponding to each of the one or more quality parameters related to the quality of the material produced by the 3D model apparatus based on the operation of the 3D model apparatus being executed, while the corrected operation of the 3D model apparatus is in execution; correcting the quality information related to the quality of the material produced by the corrected 3D model apparatus based on the calculated value corresponding to each of the one or more quality parameters; and determining whether the one or more defect scenarios are resolved based on the corrected quality information.

According to one embodiment of the present disclosure, the operations may further include: upon determining that the one or more defect scenarios are resolved, calculating a progress time and a loss value of the one or more defect scenarios while the one or more defect scenarios are in progress; and generating operational capability information of a user account for the 3D model apparatus based on the calculated progress time and loss value.

According to one embodiment of the present disclosure, the operations may further include: outputting guide information including condition information and action information required to resolve the one or more defect scenarios.

According to one embodiment of the present disclosure, the operations may further include: obtaining, when a malfunction occurs in an external device associated with the 3D model apparatus, error information related to the malfunction; and generating a defect scenario related to the malfunction of the 3D model apparatus based on the obtained error information.

According to one embodiment of the present disclosure, the first user condition information may include information associated with a value corresponding to at least one adjustment parameter included in the plurality of adjustment parameters.

Advantageous Effects

In various embodiments of the present disclosure, a user performing secondary battery production may perform training related to a method for operating a secondary battery production apparatus, a method for handling a defect situation, and so on through a simulation apparatus before being put into work; through training of the user, the loss due to the occurrence of defects may be considerably reduced so that the efficiency of the secondary battery production task may be improved effectively.

In various embodiments of the present disclosure, by generating a defect scenario based on error information in an actual apparatus, the simulation apparatus may effectively generate training contents optimized for actual work environments.

In various embodiments of the present disclosure, a simulation apparatus may generate and provide a defect scenario having various values related to the malfunction of a secondary battery production apparatus to the user; accordingly, the user may deal with a malfunction situation that may occur in an actual apparatus without help from others and may effectively learn how to respond to various situations.

In various embodiments of the present disclosure, a user may easily learn how to operate a secondary battery production apparatus through the simulation progressed step by step according to the user's task skill level.

In various embodiments of the present disclosure, a user may easily identify and process a defect scenario for which the user lacks training; thus, the user may be trained only in the defect scenario for which the user has low work skills.

In various embodiments of the present disclosure, a user may effectively improve the ability to respond to defects by training using a defect scenario generated based on a malfunction occurring in an actual work environment.

The technical effects of the present disclosure are not limited to the technical effects described above, and other technical effects not mentioned herein may be understood clearly by those with ordinary knowledge in the art (referred to as a "person with ordinary skills") to which the present disclosure belongs from the appended claims.

BRIEF DESCRIPTION OF THE DRAWINGS

Embodiments of the present disclosure will be described with reference to the accompanying drawings described below, wherein similar reference numbers denote similar constituting elements, but the present disclosure is not limited thereto.

DESCRIPTION OF EXEMPLARY EMBODIMENTS

Figure 1:
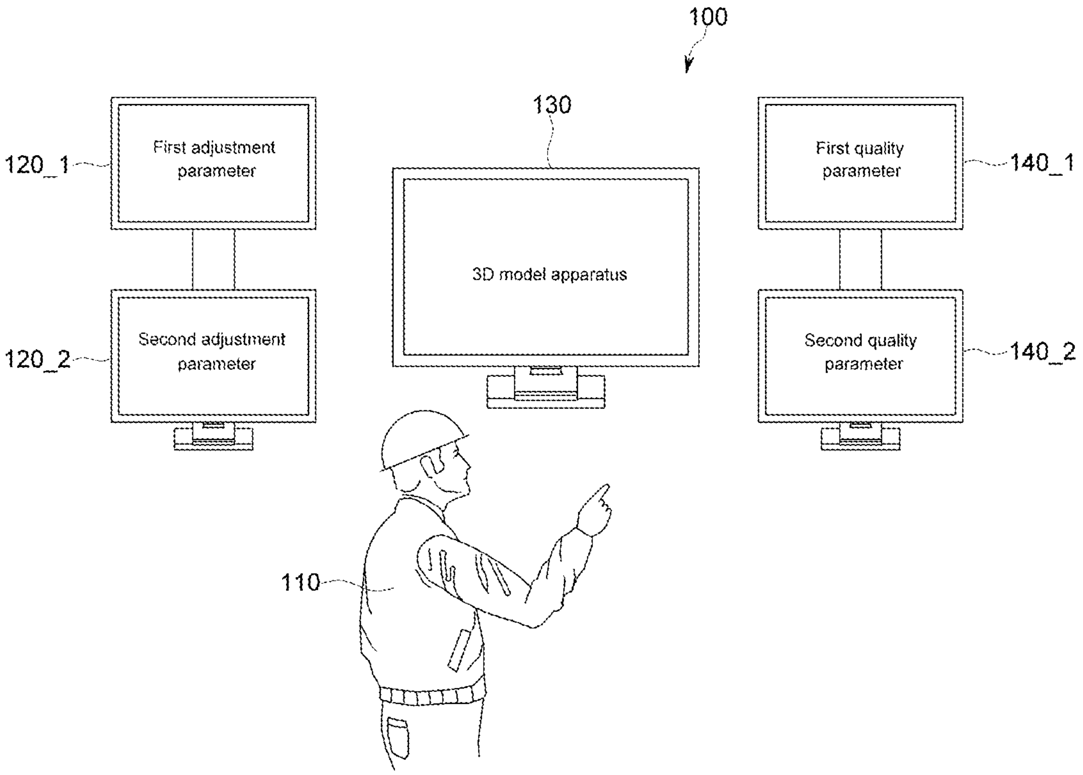
FIG. 1 illustrates an example in which a user uses a simulation apparatus according to one embodiment of the present disclosure.

In what follows, specifics for embodiment of the present disclosure will be described in detail with reference to appended drawings. However, in what follows, if a detailed description of well-known functions or configurations incorporated herein unnecessarily obscure the gist of the present disclosure, the detailed description thereof will be omitted.

In the accompanying drawings, identical or corresponding constituting elements are assigned the same reference numbers. Also, overlapping descriptions of the same or corresponding constituting elements may be omitted in the description of the embodiments below. However, even if descriptions regarding a constituting element are omitted, it should not be interpreted that the constituting element is not included in the corresponding embodiment.

The advantages and features of the present disclosure, and a method for achieving them will be clearly understood with reference to the embodiments described together with appended drawings. However, the present disclosure is not limited to the embodiments disclosed below but may be implemented in various other forms; the present embodiments are provided only to inform those skilled in the art completely of the technical scope of the present disclosure.

Terms used in the present disclosure will be briefly defined, and disclosed embodiments will be described in detail. Terms used in the present disclosure have been selected as much as possible from general terms relevant to the functions of the present disclosure and currently in wide use; however, the selection of terms may be varied depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent name but based on their meaning and context throughout the present disclosure.

In the present disclosure, a singular expression should be understood to include a plural expression unless the context explicitly indicates a singular expression. Also, a plural expression should be understood to include a singular expression unless the context explicitly indicates a plural expression. Throughout the disclosure, unless otherwise explicitly stated, if a particular element is said to include some particular element, it means that the former may further include other particular elements rather than exclude them.

The term "comprises" and/or "comprising" used in the present disclosure indicates the existence of features, steps, operations, components, and/or constituting elements; however, the term does not exclude addition of one or more other functions, steps, operations, components, constituting elements, and/or a combination thereof.

In the present disclosure, when a particular constituting element is referred to as being "coupled to," "combined with," "connected to," "related to," or as "responding to" any other constituting element, the particular constituting element may be directly coupled to, combined with, connected to, and/or related to, or may directly respond to the other constituting element; however, the present disclosure is not limited to the relationship. For example, there may be one or more intermediate constituting elements between a particular constituting element and another constituting element. Also, in the present disclosure, "and/or" may include one or more of the listed items or a combination of at least a portion of one or more of the listed items.

In the present disclosure, the terms such as "first" and "second" are introduced to distinguish one constituting element from the others, and thus the constituting element should not be limited by those terms. For example, a "first" constituting element may be used to indicate a constituting element in a form similar to or the same as a "second" constituting element.

In the present disclosure, a "secondary battery" may refer to the battery made using a material in which the redox process between a current and the material may be repeated several times. For example, to produce a secondary battery, processing such as mixing, coating, roll pressing, slitting, notching and drying, lamination, folding and stacking, lamination and stacking, packaging, charging and discharging, degassing, and characteristics inspection may be performed. In this case, separate production equipment (apparatus) for performing each process may be used. At this time, each production equipment may be operated according to adjustment parameters and configuration values set or changed by a user.

In the present disclosure, a "user" may refer to a worker who performs secondary battery production and operates secondary battery production equipment and may include a user training through a simulation apparatus for secondary battery production equipment. Also, a "user account" is an ID created to use the simulation apparatus or assigned to each user; the user may log into the simulation apparatus using the user account and perform a simulation, but the present disclosure is not limited thereto.

In the present disclosure, the "facility operating unit," "apparatus operating unit," and "quality checking unit" are software programs included in the simulation apparatus or displayed on an input/output device related to the simulation apparatus and/or an input/output device and may refer to a device and/or a program outputting an image or a video of a 3D model apparatus or receiving various inputs from a user and delivering the received inputs to the simulation apparatus.

In the present disclosure, the "3D model apparatus" is a virtual apparatus that implements actual secondary battery production equipment, which may operate in a way that images, videos, or animations of the virtual apparatus are executed, modified, and/or corrected based on the information input by a user. In other words, the "operation of the 3D model apparatus" may include images, videos, and animations of a virtual apparatus executed, modified, and/or corrected. For example, the 3D model apparatus may include apparatus for performing mixing, coating, roll pressing, slitting, notching and drying, lamination, folding and stacking, lamination and stacking, packaging, charging/discharging, degassing, and characteristics inspection. Additionally or alternatively, the 3D model apparatus may be implemented as a 2D model apparatus or implemented together with a 2D model apparatus. In other words, in the present disclosure, the 3D model apparatus is not limited to a 3D model but may include a 2D model. Accordingly, the 3D model apparatus may include terms such as a 2D model apparatus, an animation model apparatus, and a virtual model apparatus.

In the present disclosure, "user condition information" may include a user input that sets or modifies at least part of conditions and/or values among adjustment parameters or may correspond to the information generated by an arbitrary algorithm predetermined based on the corresponding user input.

In the present disclosure, "user action information" may include a user input such as a touch input, a drag input, a pinch input, and a rotation input performed on at least part of the 3D model apparatus or may correspond to the information generated by an arbitrary algorithm predetermined based on the corresponding user input.

In the present disclosure, a "defect scenario" may be a scenario that changes the operation of a 3D model apparatus within a malfunction range or includes values or conditions for changing quality information of a material determined by the operation of the 3D model apparatus into a defect range. For example, when a defect scenario occurs during the operation of the simulation apparatus, the operation or quality information of the 3D model apparatus may be changed based on the generated defect scenario. Also, when the operation or quality information of the 3D model apparatus changed by the defect scenario is corrected to lie within a normal range, the corresponding defect scenario may be determined as having been resolved.

In the present disclosure, the "training scenario" may include a scenario for operating secondary battery production equipment. For example, suppose the secondary battery production equipment is a slitter; in that case, the training scenario may include a jumbo roll replacement scenario, a pancake takeout scenario, and a fan cable core input scenario. Here, the training scenario may include a defect scenario.

In the present disclosure, the "mixing process" may be a process of producing slurry by mixing active material, a binder, and other additives with a solvent. For example, a user may determine or adjust the addition ratio of active material, conductive material, additives, and a binder to produce slurry of specific quality. Also, in the present disclosure, the "coating process" may be a process of applying the slurry on the foil with a particular amount and shape. For example, a user may determine or adjust a coater apparatus's die or slurry temperature to perform coating with a quantity and a shape of specific quality.

In the present disclosure, the "roll pressing process" may be a process in which coated electrodes are passed between two rotating upper and lower rolls and pressed to a certain thickness. For example, a user may determine or adjust the spacing between rolls to maximize the cell capacity by increasing the electrode density through the roll pressing process. Also, in the present disclosure, the "slitting process" may be a process of passing electrodes between two upper and lower rotating knives and cutting the electrodes to have a predetermined width. For example, a user may determine or adjust various adjustment parameters to maintain a constant electrode width.

In the present disclosure, the "notching and drying process" may be a process of removing moisture after punching out an electrode into a particular shape. For example, a user may determine or adjust the cutting height or length to punch out the electrode into a shape at specific quality. Also, in the present disclosure, the "lamination process" may be a process of sealing and cutting the electrode and the separator. For example, a user may determine or adjust a value corresponding to the x-axis and a value corresponding to the y-axis to perform cutting at a specific quality.

In the present disclosure, the "package process" may be a process of attaching a lead and a tape to an assembled cell and packaging the assembled cell in an aluminum pouch, and the "degas process" may be a process of removing gas in the cell to prevent air from flowing into the cell and leakage of electrolyte. Also, in the present disclosure, the "characteristics inspection process" may be a process of checking characteristics such as thickness, weight, and insulation voltage of a cell using a measurement device before shipment of the cell. For the processes above, a user may adjust conditions or values of various adjustment parameters or change configuration values corresponding to the apparatus so that each process is performed with specific quality within a normal range.

FIG. 1 illustrates an example in which a user 110 uses a simulation apparatus 100 according to one embodiment of the present disclosure. As shown in the figure, the simulation apparatus 100 is used for training a secondary battery production worker (e.g., user 110) and may include a facility operating unit 120, an apparatus operating unit 130, and a quality checking unit 140. For example, the user 110 may manipulate the simulation apparatus 100 embodied in 3D and learn how to use the secondary battery production equipment or how to respond when the quality of the manufactured product is degraded.

According to one embodiment, the facility operating unit 120 may include a plurality of adjustment parameters for determining the operation of the 3D model apparatus displayed on the apparatus operating unit 130; for example, a first facility operating unit 120_1 may include a first adjustment parameter (e.g., adjustment parameters of a first set), and a second facility operating unit 120_2 may include a second adjustment parameter (e.g., adjustment parameters of a second set). The user 110 may execute, change, and/or correct the operation of the 3D model apparatus by changing at least part of the conditions among the first and second adjustment parameters. In other words, the operation of the 3D model apparatus may be changed or corrected adaptively as the adjustment parameters input by the user 110 are changed.

The apparatus operating unit 130 may include a 3D model apparatus related to the production of secondary batteries. Here, the 3D model apparatus may include a 3D model related to secondary battery production equipment such as, but not limited to, a mixer, a coater, a slitter, a roll presser apparatus, a lamination apparatus, and a lamination & stacking (L&S) apparatus and may further include a 3D model of any other apparatus used for the production of secondary batteries. According to one embodiment, the user 110 may manipulate the 3D model apparatus or change the configuration of the 3D model apparatus by applying a touch input, a drag input, or a pinch input to the 3D model apparatus (at least part of the 3D model apparatus) included in the apparatus operating unit 130. In this case, the user 110 may check or enlarge/reduce an arbitrary area of the 3D model apparatus through view switching, operate the 3D model apparatus by performing a touch input, or change the configuration of the 3D model apparatus. Here, it is assumed that the apparatus operating unit 130 displays a 3D model apparatus related to secondary battery production; however, the present disclosure is not limited to the assumption, and thus, an apparatus related to a specific process in the secondary battery production process may be implemented and displayed as a 2D model apparatus.

The quality checking unit 140 may include quality information related to the quality of the material produced by the 3D model apparatus; for example, a first quality checking unit 140_1 may include a first quality parameter (e.g., a first set of quality parameters), and a second quality checking unit 140_2 may include a second quality parameter (e.g., a second set of quality parameters). Here, the quality information may be generated by performing an operation on the first parameter and the second parameter based on a predetermined criterion and/or algorithm. In other words, the user 110 may check the quality information generated in response to changing the adjustment parameter or manipulating the 3D model apparatus through the quality checking unit 140. Additionally or alternatively, the quality checking unit 140 of a specific process according to the secondary battery production process may be included in the apparatus operating unit 130. In this case, the quality information may be displayed in association with the 3D model apparatus of the apparatus operating unit 130 or checked by a specific operation of the 3D model apparatus. For example, when a button for quality checking displayed on the apparatus operating unit 130 is selected, quality information may be displayed or output. In another example, the quality information may be displayed or output by a color change of at least part of an area of the 3D model apparatus.

In FIG. 1, the simulation apparatus 100 is illustrated as including two facility operating units 1201, 120_2 and two quality checking units 1401, 140_2; however, the present disclosure is not limited to the specific illustration, and an arbitrary number of facility operating units 120 and quality checking units 140 may be employed depending on the type of 3D model apparatus related to the simulation apparatus 100. Based on the configuration, the user 110 performing secondary battery production may be trained in a method for operating the secondary battery production equipment or a method for responding to a defect situation before being put into work; by training the user 110 as described above, loss due to the occurrence of defects may be considerably reduced, and thus, the efficiency of the secondary battery production task may be improved effectively.

Figure 2:
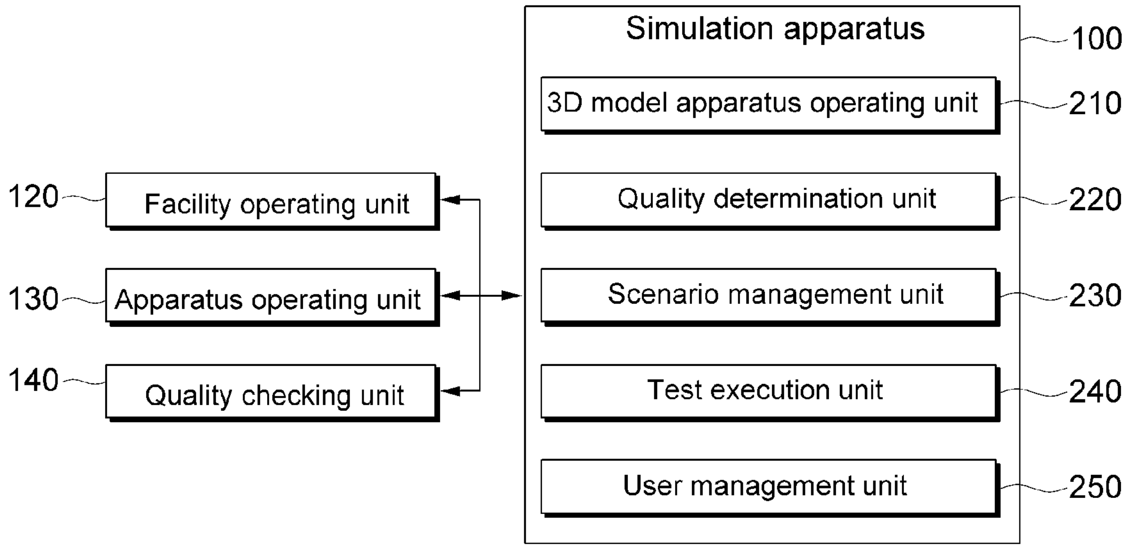
FIG. 2 is a functional diagram illustrating an internal structure of a simulation apparatus according to one embodiment of the present disclosure.

FIG. 2 is a functional diagram illustrating an internal structure of a simulation apparatus 100 according to one embodiment of the present disclosure. As shown in the figure, the simulation apparatus 100 (e.g., at least one processor of the simulation apparatus 100) may include, but not limited to, a 3D model apparatus operating unit 210, a quality determination unit 220, a scenario management unit 230, a test execution unit 240, and a user management unit 250. The simulation apparatus 100 may communicate with the facility operating unit 120, the apparatus operating unit 130, and the quality checking unit 140 and exchange data and/or information related to the 3D model apparatus.

The 3D model apparatus operating unit 210 may execute, change, and/or correct the operation of the 3D model apparatus displayed on the apparatus operating unit 130 according to a user's manipulation. According to one embodiment, the 3D model apparatus operating unit 210 may obtain or receive user action information and/or user condition information using information input from the user (e.g., a secondary battery production worker). Then, the 3D model apparatus operating unit 210 may determine or change the operation of the 3D model apparatus using the obtained or received user action information and/or user condition information.

According to one embodiment, the user action information is generated based on a user input such as touching at least part of an area of the 3D model apparatus included in the apparatus operating unit 130 and may include the information on the amount of change in a setting value of the 3D model apparatus according to the user input. For example, when the 3D model apparatus is a coater apparatus for secondary battery production, the user may select and release a fixing bolt in the die area of the coater apparatus through the apparatus operating unit 130 by a touch input and change a shim offset, where, in this case, user action information based on the changed shim offset may be generated. In another example, when the 3D model apparatus is a DSF & EOL apparatus, the user may select a specific area of the DSF & EOL apparatus by a touch input through the apparatus operating unit 130 to replace a consumable of a measurement instrument, where, in this case, user action information based on the replaced consumable may be generated.

According to one embodiment, the user condition information is generated based on a user input that changes conditions and/or values of at least part of parameters among a plurality of adjustment parameters included in the facility operating unit 120 and may include the information on the amount of change in a condition value to determine the operation of the 3D model apparatus according to the user input. For example, when the 3D model apparatus is a coater apparatus for secondary battery production, the user may change the die bending parameter to a specific value through the facility operating unit 120; in this case, user condition information based on the value of a changed die bending parameter may be generated.

As described above, when the operation of the 3D model apparatus is executed based on the user condition information and/or the user action information, the quality determination unit 220 may determine or generate quality information related to the quality of a material generated by the operation of the 3D model apparatus. In other words, when the 3D model apparatus operates (when animations or images are played to operate the 3D model apparatus), the quality information may be determined or generated differently according to a setting value or a condition value of the corresponding 3D model apparatus. In other words, the user may change or adjust the quality of a material generated by a 3D model apparatus by changing adjustment parameters or setting at least part of an area of the corresponding 3D model apparatus using a touch input.

According to one embodiment, the quality determination unit 220 may determine or extract one or more quality parameters for determining the quality of a material produced by the 3D model apparatus, and while the operation of the 3D model apparatus is in execution, a value corresponding to each of one or more quality parameters determined based on the operation of the 3D model apparatus under execution may be calculated. Here, a predetermined, arbitrary algorithm may calculate the value corresponding to the quality parameter. Also, the quality determination unit 220 may generate quality information related to the quality of a material produced by the 3D model apparatus based on a value corresponding to each of the one or more quality parameters calculated. For example, when the 3D model apparatus is a coater apparatus for secondary battery production and a user adjusts a die bending parameter, a loading level may be determined as a quality parameter, and a value corresponding to the loading level may be calculated. In this case, the quality determination unit 220 may generate or output quality information including the calculated loading level.

According to one embodiment, a defect scenario related to a malfunction of the 3D model apparatus may occur during or before the operation of the 3D model apparatus. When a defect scenario occurs as described above, at least part of the setting values, condition values, and quality information of the 3D model apparatus may be changed to lie between an abnormal range based on the defect scenario.

According to one embodiment, the scenario management unit 230 may determine one or more defect scenarios among a plurality of defect scenarios related to a malfunction of the 3D model apparatus and, based on the determined one or more defect scenarios, may change at least one of quality information related to the operation of the 3D model apparatus and quality of the material. For example, when the 3D model apparatus is a coater apparatus, the plurality of defect scenarios may include a surface defect, a loading level defect, an uncoated portion width defect, and a mismatch defect. In this case, the scenario management unit 230 may determine a defect scenario by extracting at least one from among a surface defect, a loading level defect, an uncoated portion width defect, and a mismatch defect and change the adjustment parameter, operation, and quality information of the 3D model apparatus according to the extracted or determined defect scenario.

According to one embodiment, when a defect scenario occurs, the user may change the adjustment parameter or the settings of the 3D model apparatus to solve the occurred defect scenario. In this case, the scenario management unit 230 may receive at least one of user action information and user condition information for resolving the determined one or more defect scenarios and correct the operation of the 3D model apparatus changed based on at least one of the received user action information and user condition information. Also, while the operation of the corrected 3D model apparatus is in execution, the scenario management unit 230 may calculate a value corresponding to each of a plurality of quality parameters related to the quality of a material produced by the 3D model apparatus based on the operation of the 3D model apparatus in execution and may correct the quality information related to the quality of a material generated by the corrected 3D model apparatus based on the value corresponding to each of the plurality of calculated quality parameters.

Then, the scenario management unit 230 may determine whether one or more defect scenarios have been resolved using the corrected quality information. For example, when the quality of a material falls within a predetermined normal range, the scenario management unit 230 may determine that the defect scenario has been resolved, but the present disclosure is not limited to the specific operation; when the value of each quality parameter included in the quality information lies within a predetermined normal range or corresponds to a specific value, the scenario management unit 230 may determine that the defect scenario has been resolved. Additionally or alternatively, when a value calculated by providing each quality parameter to an arbitrary algorithm falls within a predetermined normal range, the scenario management unit 230 may determine that the defect scenario has been resolved.

According to one embodiment, a setting value and a condition value of the 3D model apparatus changed to lie within the range of a malfunction by a defect scenario may be determined in advance for each defect scenario, but the present disclosure is not limited to the specific operation. For example, the defect scenario may be generated based on error information generated when actual secondary battery production equipment malfunctions. In other words, when a malfunction occurs in an external device (e.g., actual secondary battery production equipment) related to the 3D model apparatus, the scenario management unit 230 may obtain error information related to the malfunction and, based on the obtained error information, may generate a defect scenario related to the malfunction of the 3D model apparatus. For example, when a malfunction occurs in the coater, the scenario management unit 230 may obtain a value of each adjustment parameter and a setting value of the coater at the time of the malfunction as error information. The scenario manager 230 may generate a defect scenario by changing the obtained value of each adjustment parameter and each obtained setting value of the apparatus to correspond to the 3D model apparatus. Since a defect scenario is generated based on the error information from an actual apparatus using the configuration above, the simulation apparatus 100 may effectively generate training contents optimized for actual work environments.

According to one embodiment, the test execution unit 240 may determine whether one or more defect scenarios have been resolved using the corrected quality information; when it is determined that one or more defect scenarios have been resolved, the test execution unit 240 may calculate a progress time and a loss value of one or more defect scenarios while one or more defect scenarios are in progress. For example, the loss value may include a coating loss value and a material loss value and may be calculated through a predetermined, arbitrary algorithm based on a user's response time, a user input value, and the like. Also, the test execution unit 240 may generate operational capability information of the 3D model apparatus for a user account based on the calculated progress time and loss value. Here, the user account may refer to an account of a worker who uses the simulation apparatus 100, and the operational capability information represents the work skill level of the user, which may include a work speed, degree of proximity to a target value, and an evaluation score. Additionally, when the corresponding user solves all predetermined types of defect scenarios, the test execution unit 240 may determine whether the user passes a simulation training based on the operational capability information for each defect scenario.

The user management unit 250 may perform management such as registration, modification, and deletion of a user account related to a user who uses the simulation apparatus 100. According to one embodiment, the user may use the simulation apparatus 100 using the user's registered user account. In this case, the user management unit 250 may store and manage information on whether each defect scenario has been resolved and operational capability information for dealing with each defect scenario in an arbitrary database for each user account. Using the information stored by the user management unit 250, the scenario management unit 230 may extract information related to a specific user account stored in the database and extract or determine at least one scenario among a plurality of defect scenarios based on the extracted information. For example, the scenario management unit 230 may extract only a defect scenario in which the working speed is lower than an average working speed based on the information related to the user account or provide the extracted defect scenario to the corresponding user, but the present disclosure is not limited to the specific operation; the defect scenario may be extracted or determined by another arbitrary criterion or a combination of arbitrary criteria.

In FIG. 2, it is assumed that functional configurations included in the simulation apparatus 100 are different from each other; however, the assumption is intended only to help understand the disclosure, and one computing device may perform two or more functions. Also, the simulation apparatus 100 of FIG. 2 assumes to be distinguished from the facility operating unit 120, the apparatus operating unit 130, and the quality checking unit 140; however, the present disclosure is not limited to the assumption, and the facility operating unit 120, the apparatus operating unit 130, and the quality checking unit 140 may be included in the simulation apparatus 100. Using the configuration above, the simulation apparatus 100 may generate a defect scenario having various values related to a malfunction of the secondary battery production equipment and provide the generated defect scenario to the user; accordingly, the user may resolve a malfunction situation that may occur in an actual apparatus without help from others and effectively learn how to respond to each situation.

Figure 3:
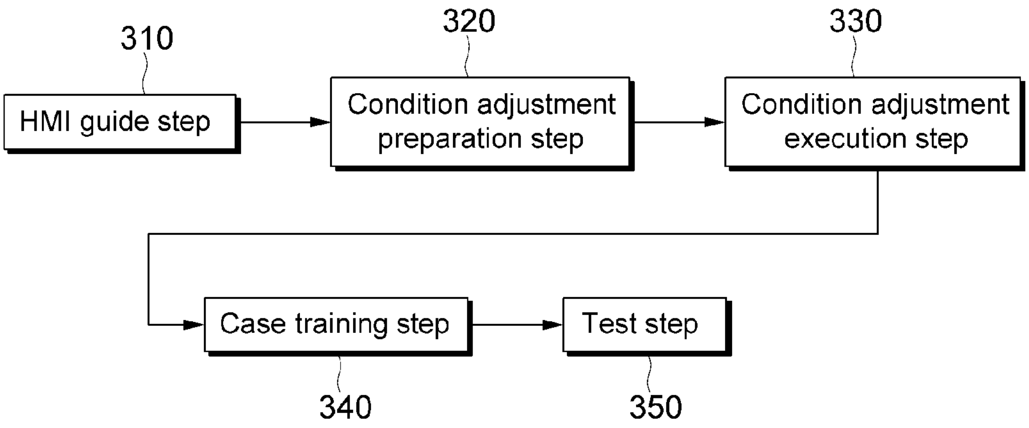
FIG. 3 is a block diagram illustrating an example in which a simulation apparatus operates according to one embodiment of the present disclosure.

FIG. 3 is a block diagram illustrating an example in which a simulation apparatus 100 operates according to one embodiment of the present disclosure. As shown in the figure, the simulation apparatus (100 of FIG. 1) may be operated through a Human-Machine Interface (HMI) guide step 310, a condition adjustment preparation step 320, a condition adjustment execution step 330, a case training step 340, and a test step 350. In other words, a user may be trained in a method for operating secondary battery production equipment through the steps 310, 320, 330, 340, 350.

The HMI guide step 310 may be a step of learning the types of various adjustment parameters included in the facility operating unit and a method for manipulating adjustment parameters. For example, a work specification indicating the types of adjustment parameters and a method for manipulating adjustment parameters may be displayed or output on the facility operating unit, the apparatus operating unit, and the like. Additionally, a portion of the screen may be turned on or activated so that the user may perform a task corresponding to the work specification. In this case, the user may be trained in how to use the facility operating unit by manipulating a condition and/or a value of an arbitrary adjustment parameter corresponding to the work specification. When the user touches a button for a predetermined time according to the work specification or enters a correct value corresponding to an arbitrary parameter, the next step may be performed, or a button that leads to the next step (e.g., NEXT button) may be displayed or activated.

The condition adjustment preparation step 320 may be a step in which a user learns how to set initial values of the facility operating unit, the apparatus operating unit, and the quality checking unit before operating the secondary battery production apparatus. For example, a work specification indicating initial values of the facility operating unit, the apparatus operating unit, and the quality checking unit may be displayed or output on the facility operating unit and the apparatus operating unit. Additionally, a portion of the screen may be turned on or activated so that the user may perform a task corresponding to the work specification. In this case, the user may learn how to set initial values by checking the setting values (e.g., a shim number or a shim model name) of a 3D model apparatus corresponding to the work specification by using a touch input or the like. When the user completes the initial value setting according to the work specification, the next step may be performed, or a button that leads to the next step (e.g., NEXT button) may be displayed or activated.

The condition adjustment execution step 330 may be a step in which a user learns how to check and take action on defects occurring during the operation of the secondary battery production apparatus. For example, in the case of a coater, a line defect, a loading level defect, an uncoated portion width defect, an insulation defect, a sampling defect, and a mismatch defect may occur; along with the occurrence of a defect, the type of adjustment parameter required to be manipulated, the value of the adjustment parameter, and a setting value of the 3D model apparatus for dealing with the defect may be displayed or output. A user may process a defect based on the displayed information and learn a defect-solving method.

The case training step 340 may be a step in which a user repeatedly processes or solves each defect scenario or a combination of a plurality of defect scenarios related to a secondary battery production apparatus to master a defect-solving method. For example, the user may directly select one defect scenario among a plurality of defect scenarios and be trained in the selected scenario, but the present disclosure is not limited to the operation; the user may be trained in a defect scenario determined randomly by the simulation apparatus. In this case, the case training step 340 may display or output guide information including condition information and action information required to solve each defect according to the defect scenario. Here, when a user manipulates a specific adjustment parameter or changes a setting value of the 3D model apparatus, the operation of the 3D model apparatus and the quality of a material related to the 3D model apparatus may be changed in real-time. By checking the changed quality, the user may resolve the defect scenario through repeated training and improve the skill in coping with the defect.

The test step 350 may be a step evaluating the operational capability of a user by testing the process through which the user solves a defect scenario. For example, when a user solves each defect scenario, the operational capability of the user may be measured or evaluated based on a progress time and a loss value of the defect scenario. The user may additionally learn or train for an incomplete defect scenario by checking the operational capability and whether the user has passed the test.

Although FIG. 3 assumes that each step is sequentially performed, the present disclosure is not limited to the assumption, and some of the steps may be omitted. Also, the order of performing the steps may be changed. For example, the case training step 340 may be performed again after the testing step 350. Based on the configuration, the user may easily learn how to operate the secondary battery production apparatus through the simulation progressed step by step according to the user's task skill.

Figure 4:
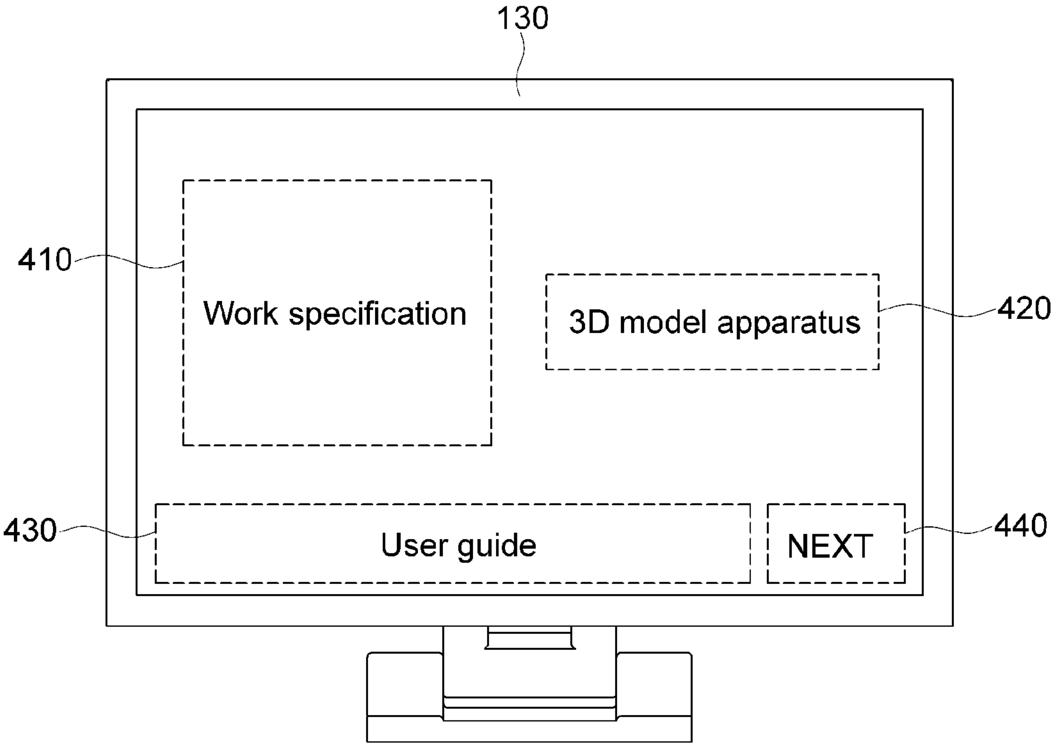
FIG. 4 illustrates an example of a display screen displayed or output on an apparatus operating unit according to one embodiment of the present disclosure.

FIG. 4 illustrates an example of a display screen displayed or output on an apparatus operating unit 130 according to one embodiment of the present disclosure. As shown in the figure, the apparatus operating unit 130 may display or output text, an image, and a video including a work specification 410, a 3D model apparatus 420, a user guide 430, and NEXT button 440 on the display screen. FIG. 4 assumes that the work specification 410, the 3D model apparatus 420, the user guide 430, and the NEXT button 440 are displayed in a specific area on the display screen, but the present disclosure is not limited to the assumption; each of the text, image, and video may be displayed in an arbitrary area of the display screen.

As described above, the work specification 410 is a document containing initial setting values and condition values of the 3D model apparatus 420 and may be predetermined or generated by a particular algorithm. For example, the simulation apparatus may receive and provide the contents of the work specification used to operate actual secondary battery production equipment or generate a new work specification by calculating the initial setting values and condition values of the 3D model apparatus 420 based on a plurality of input work specifications. Here, the 3D model apparatus 420 may be a 3D image or video implementing the secondary battery production equipment in a 3D form. For example, the 3D model apparatus 420 may operate based on user condition information and/or user action information input from a user.

The user guide 430 may be the information for guiding a user's next action, which includes information necessary to operate the 3D model apparatus 420, condition information and action information required to solve a defect scenario, and so on. In other words, even when the user does not know how to operate the simulation apparatus, the user may be trained in a method for operating the simulation apparatus and a method for dealing with a defect using the user guide 430.

When the condition value or setting value of the 3D model apparatus is determined or the 3D model apparatus 420 is operated using the displayed work specification 410 and user guide 430, the corresponding step (e.g., HMI guide step or condition adjustment preparation step) is resolved, and the NEXT button 440 for proceeding to the next step (e.g., condition adjustment execution step, case training step, or test step) may be activated. The user may select the activated NEXT button 440 through a touch input to perform training corresponding to the next step.

Figure 5:
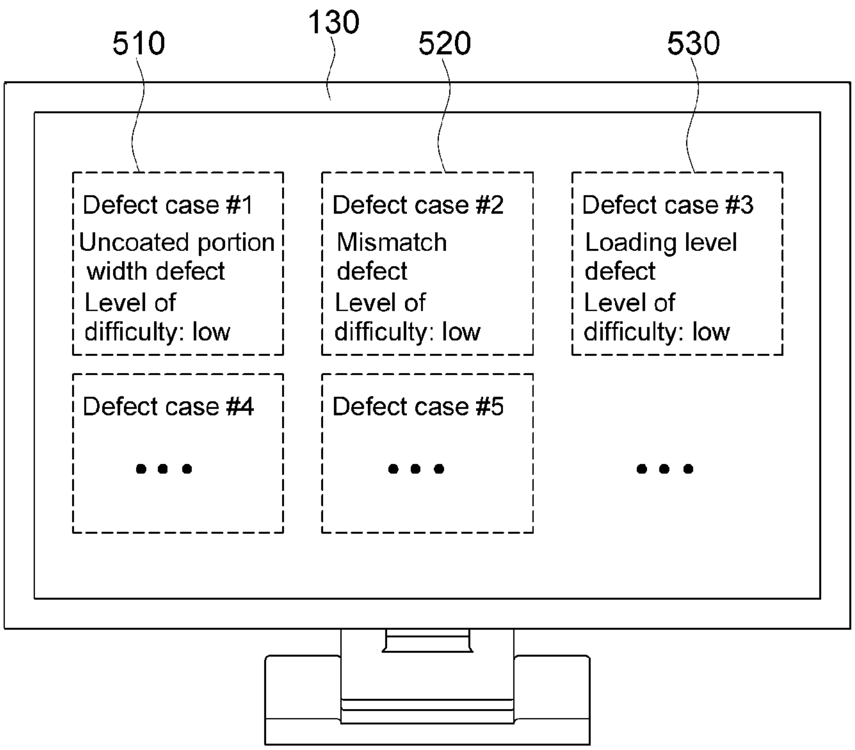
FIG. 5 illustrates an example of a display screen displayed or output on an apparatus operating unit according to another embodiment of the present disclosure.

FIG. 5 illustrates an example of a display screen displayed or output on an apparatus operating unit 130 according to another embodiment of the present disclosure. As shown in the figure, the apparatus operating unit 130 may display or output text, an image, or a video including a plurality of defect scenarios 510, 520, 530 on the display screen. FIG. 5 assumes that a first defect scenario 510, a second defect scenario 520, and a third defect scenario 530 are displayed in specific areas on the display screen, but the present disclosure is not limited to the assumption; each text, image, or video may be displayed in any position on the display screen.

According to one embodiment, each defect scenario may include details and the level of difficulty of the defect scenario. For example, the first defect scenario 510 may be an uncoated portion width defect with a low level of difficulty, the second defect scenario 520 may be a mismatch defect with a low level of difficulty, and the third defect scenario 530 may be a loading level defect with a low level of difficulty. A user may select at least part of the plurality of defect scenarios 510, 520, 530 displayed on the display screen through a touch input to perform training based on the selected defect scenario.

Additionally or alternatively, one defect scenario among the plurality of defect scenarios 510, 520, 530 may be determined by a predetermined algorithm. For example, through a user account (or information related to the user account) of a user performing training, the simulation apparatus may determine a defect scenario for which the user is not fully skilled or a combination of defect scenarios. Here, the user's work skill level may be calculated or determined as a test result for each defect scenario, but the present disclosure is not limited to the specific scheme. Based on the configuration, the user may easily identify and process a defect scenario for which the user lacks training; thus, the user may be trained only in the defect scenario for which the user has low work skills.

Figure 6:
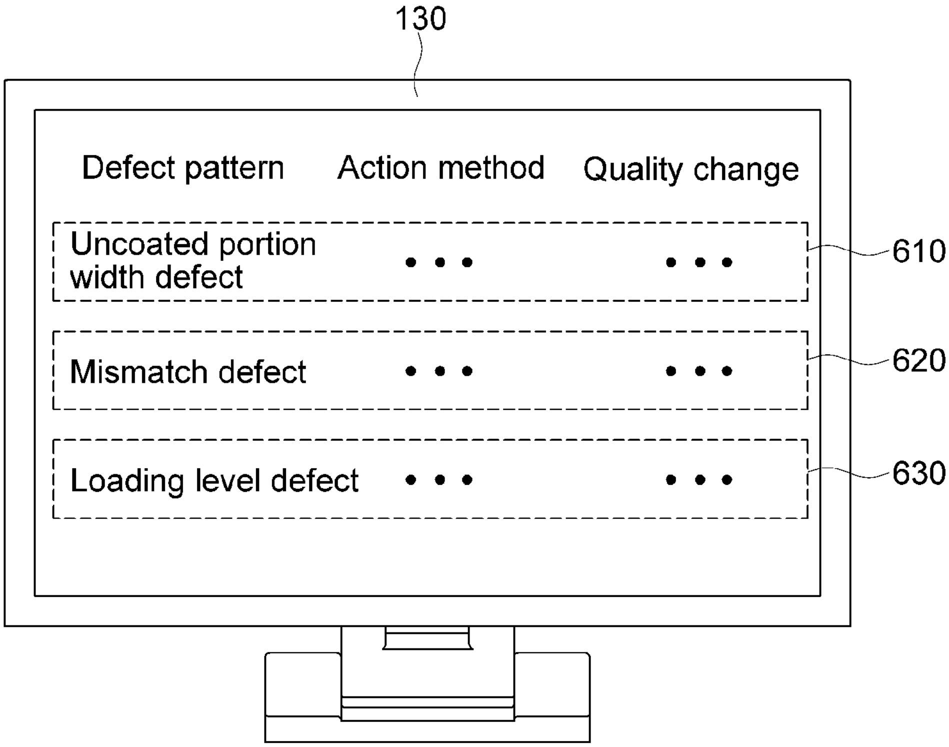
FIG. 6 illustrates an example of a display screen displayed or output on an apparatus operating unit according to yet another embodiment of the present disclosure.

FIG. 6 illustrates an example of a display screen displayed or output on an apparatus operating unit 130 according to yet another embodiment of the present disclosure. As shown in the figure, the apparatus operating unit 130 may display or output text, an image, or a video related to the guide information 610, 620, 630 including condition information and action information required to resolve each defect scenario. FIG. 6 assumes that first guide information 610, second guide information 620, and third guide information 630 are displayed in specific areas on the display screen, but the present disclosure is not limited to the assumption; each text, image, or video may be displayed in any position on the display screen.

According to one embodiment, the guide information 610, 620, 630 may include a defect pattern, an action method, and a quality change level according to a change in a setting value and/or a condition value of the 3D model apparatus. For example, the first guide information 610 may include an action method and a quality change level related to an uncoated portion width defect, the second guide information 620 may include an action method and a quality change level related to a mismatch defect, and the third guide information 630 may include an action method and a quality change level related to a loading level defect. The user may perform training to produce a material with quality lying within a normal range by checking a defect pattern and an action method corresponding to each defect pattern and manipulating a condition and/or a value of an adjustment parameter or adjusting setting values of the 3D model apparatus.

FIG. 6 assumes that the guide information 610, 620, 630 is displayed or output on the apparatus operating unit 130, but the present disclosure is not limited to the assumption; the guide information may be displayed on a separate display apparatus.

Figure 7:
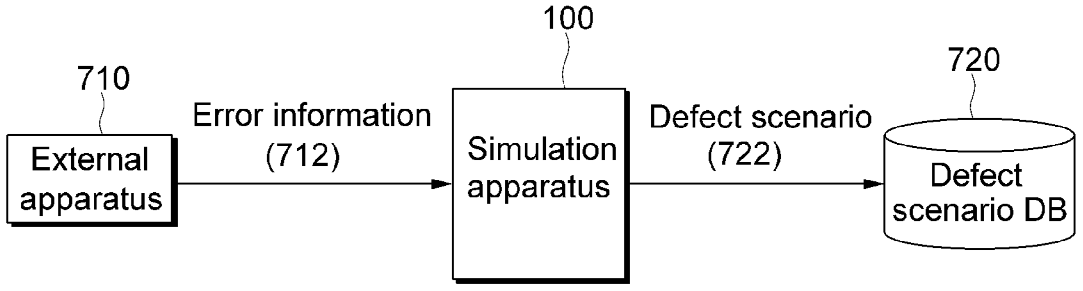
FIG. 7 illustrates an example in which a defect scenario is generated according to one embodiment of the present disclosure.

FIG. 7 illustrates an example in which a defect scenario 722 is generated according to one embodiment of the present disclosure. As shown in the figure, the simulation apparatus 100 may communicate with an external device (e.g., secondary battery production equipment) 710 and a defect scenario DB 720 and exchange data and/or information required for generating the defect scenario 722.

According to one embodiment, when a malfunction occurs in an external device 710, the simulation apparatus 100 may receive or obtain error information 712 related to the malfunction from the external device 710. Here, the error information 712 may include operation information of the external device 710 when the malfunction occurs and the quality change level of a material generated by the external device 710. In this case, the simulation apparatus 100 may determine condition values and setting values of a 3D model apparatus and/or each quality parameter value of the quality information and generate a defect scenario 722 having the condition values and the setting values of the determined 3D model apparatus and/or the quality parameter values to respond to the corresponding error information 712. The generated defect scenario 722 may be stored and managed in the defect scenario DB 720. For example, the simulation apparatus 100 may determine condition values and setting values of a 3D model apparatus and/or each quality parameter value of the quality information and generate a defect scenario 722 to respond to the error information 712 by using an arbitrary algorithm for generating a defect scenario 722 and/or a trained machine learning model.

According to one embodiment, the processor may convert the operation information of the external device 710 into a first set of parameters related to the operation of the 3D model apparatus and convert the quality change level of a material generated by the external device 710 into a second set of parameters related to the quality information related to the quality of a material produced by the 3D model apparatus. Then, the processor may determine the category of a malfunction occurring in the external device 710 using the converted first set of parameters and second set of parameters and generate a defect scenario based on the determined category, the first set of parameters, and the second set of parameters.

FIG. 7 assumes that a defect scenario is generated when a malfunction occurs in the external apparatus 710, but the present disclosure is not limited to the assumption; for example, a defect scenario may be predetermined by an arbitrary user. In another example, a defect scenario may be generated by randomly determining setting values, condition values, and quality information related to the 3D model apparatus within a predetermined, abnormal range. Based on the configuration above, a user may be trained using a defect scenario generated based on a malfunction occurring in actual work environments, thereby effectively improving the ability to respond to defects.

Figure 8:
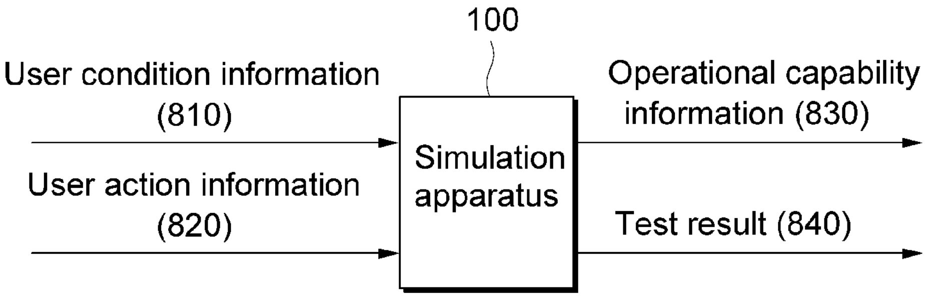
FIG. 8 illustrates an example in which operational capability information and a test result are generated according to one embodiment of the present disclosure.

FIG. 8 illustrates an example in which operational capability information 830 and a test result 840 are generated according to one embodiment of the present disclosure. As described above, when a defect scenario occurs, the simulation apparatus 100 may receive user condition information 810 and user action information 820 from a user and, based on the received user condition information 810 and user action information 820, determine whether the defect scenario has been resolved.

According to one embodiment, when it is determined that a defect scenario has been resolved, the simulation apparatus 100 may calculate a progress time and a loss value of the defect scenario while the defect scenario is in progress and, based on the calculated progress time and loss value, generate the operational capability information 830 for the 3D model apparatus of a user account. In this case, a test result 840 may be output together with the operational capability information 830. For example, a user related to the corresponding user account may take a test for an arbitrary defect scenario, and when all defect scenarios related to a specific 3D model apparatus are resolved according to a predetermined criterion, the simulation apparatus 100 may determine that the corresponding user has passed a simulation for the specific 3D model apparatus.

Figure 9:
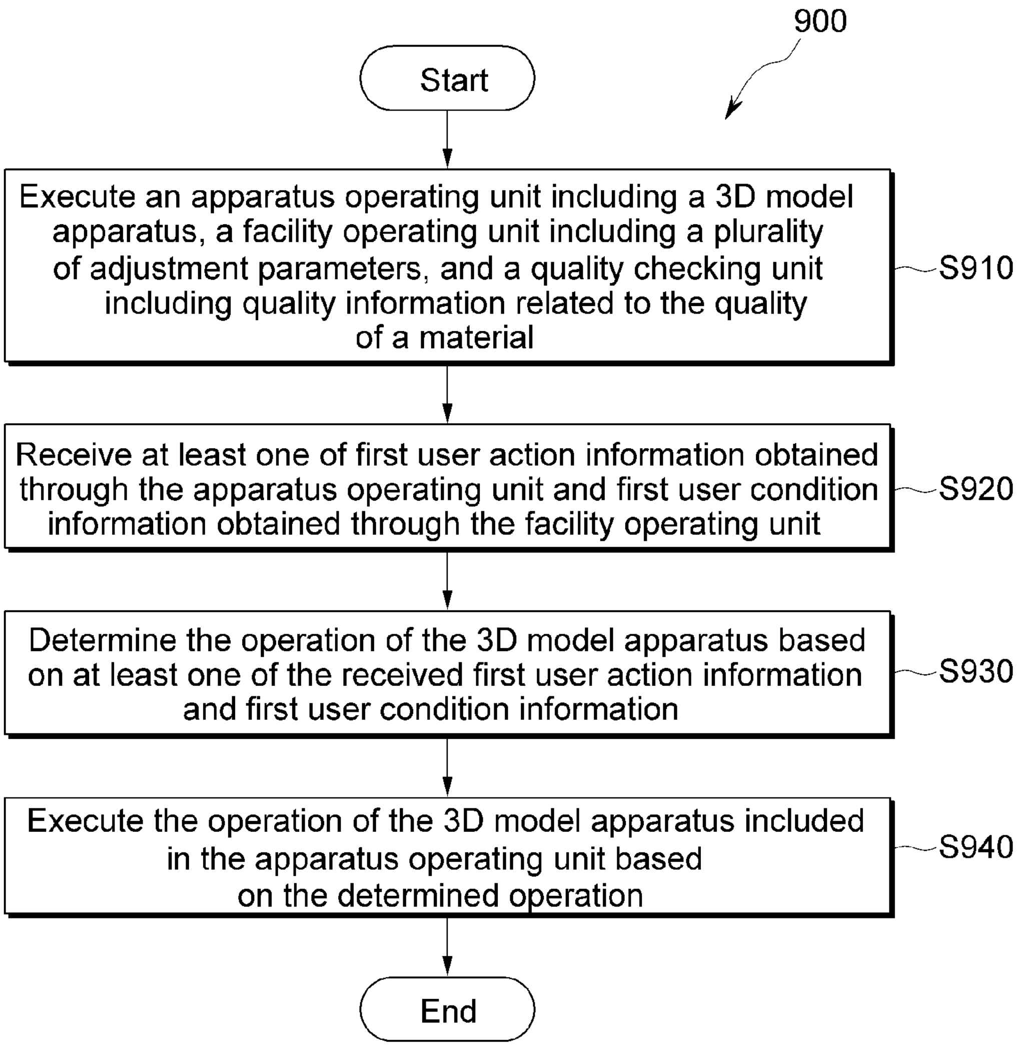
FIG. 9 illustrates an example of a simulation method for secondary battery production according to one embodiment of the present disclosure.

FIG. 9 illustrates an example of a simulation method 900 for secondary battery production according to one embodiment of the present disclosure. The simulation method 900 for secondary battery production may be performed by a processor (e.g., at least one processor of a simulation apparatus). As shown in the figure, the simulation method 900 for secondary battery production may be initiated as the processor executes an apparatus operating unit including a 3D model apparatus related to secondary battery production, a facility operating unit including a plurality of adjustment parameters for determining the operation of the 3D model apparatus, and a quality checking unit including quality information related to the quality of a material produced by the 3D model apparatus S910.

The processor may obtain at least one of first user action information obtained through the apparatus operating unit and first user condition information obtained through the facility operating unit S920. Here, the first user condition information may include information related to a value corresponding to at least one adjustment parameter among a plurality of adjustment parameters.

The processor may determine the operation of the 3D model apparatus based on at least one of the first user action information and the first user condition information obtained S930. Also, the processor may execute the operation of the 3D model apparatus included in the apparatus operating unit based on the determined operation S940. When receiving the first user action information, the processor may determine whether the received first user action information corresponds to a predetermined operating condition of the 3D model apparatus and approve the operation of the 3D model apparatus when it is determined that the first user action information corresponds to the predetermined operating condition of the 3D model apparatus.

According to one embodiment, the processor may determine one or more quality parameters for determining the quality of a material produced by the 3D model apparatus and, while the operation of the 3D model apparatus is executed, calculate a value corresponding to each of the determined one or more quality parameters based on the operation of the 3D model apparatus in execution. Also, the processor may generate quality information related to the quality of a material produced by the 3D model apparatus based on the calculated value corresponding to each of the one or more quality parameters.

According to one embodiment, the processor may determine one or more defect scenarios among a plurality of defect scenarios related to a malfunction of the 3D model apparatus and change at least one of the 3D model apparatus's operation and quality information related to the quality of a material based on the determined one or more defect scenarios. Then, the processor may receive at least one of second user action information and second user condition information for resolving the determined one or more defect scenarios and, based on at least one of the received second user action information and second user condition information, correct the changed operation of the 3D model apparatus. Also, while the corrected operation of the 3D model apparatus is executed, the processor may calculate a value corresponding to each of a plurality of quality parameters related to the quality of a material produced by the 3D model apparatus based on the operation of the 3D model apparatus in execution. In this case, the processor may correct the quality information related to the quality of a material generated by the corrected 3D model apparatus based on the calculated value corresponding to each of the plurality of quality parameters and, by using the corrected quality information, determine whether one or more defect scenarios have been resolved.

Figure 10:
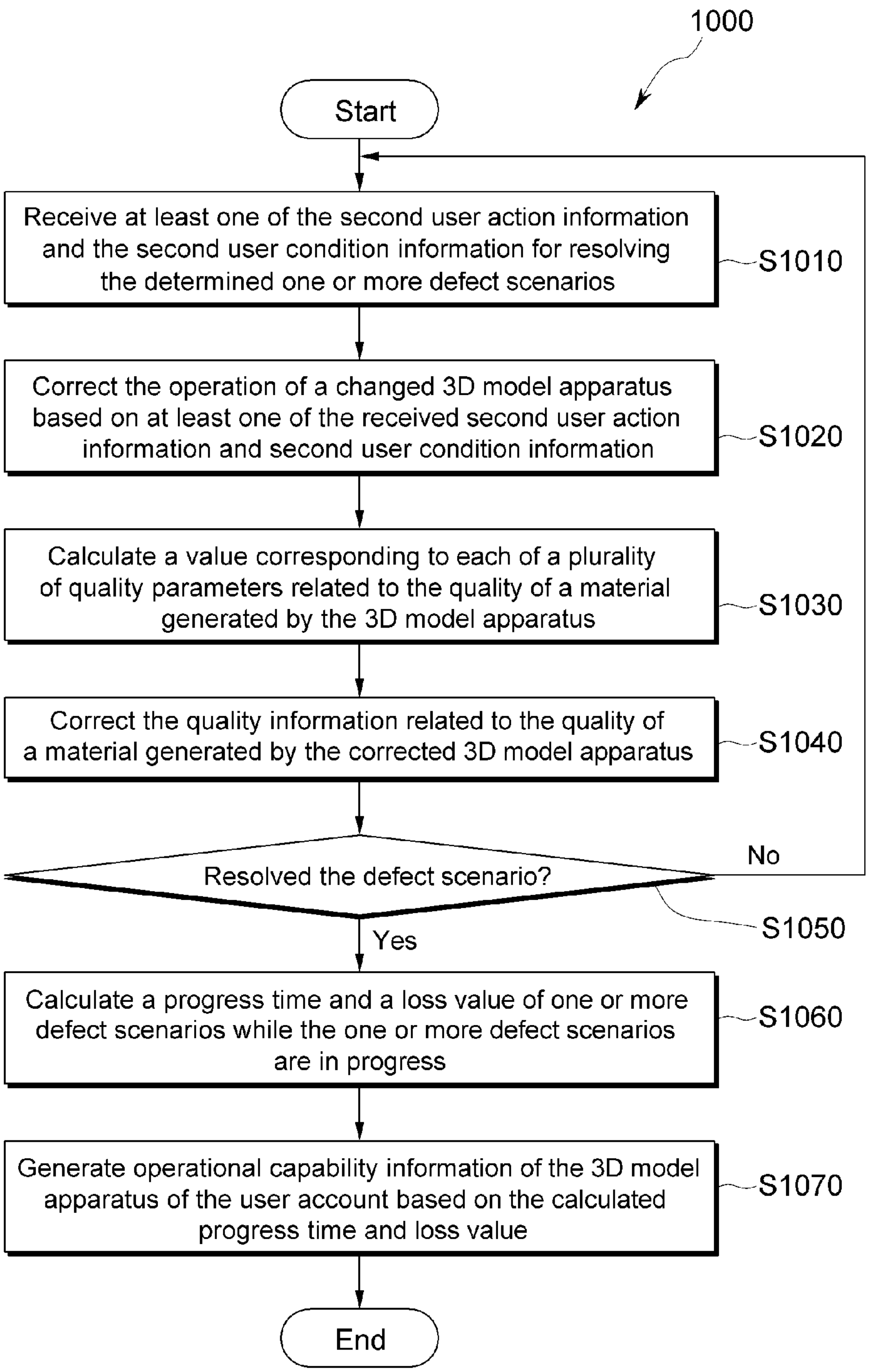
FIG. 10 illustrates an example of a method for calculating a test result according to one embodiment of the present disclosure.

FIG. 10 illustrates an example of a method for calculating a test result 1000 according to one embodiment of the present disclosure. The method for calculating a test result 1000 may be performed by a processor (e.g., at least one processor of a simulation apparatus). As shown in the figure, the method for calculating a test result 1000 may be initiated as the processor receives at least one of second user action information and second user condition information for resolving determined one or more defect scenarios S1010.

As described above, the processor may correct the changed operation of the 3D model apparatus based on at least one of the received second user action information and second user condition information S1020. Also, while the corrected operation of the 3D model apparatus is executed, the processor may calculate a value corresponding to each of a plurality of quality parameters related to the quality of a material produced by the 3D model apparatus based on the operation of the 3D model apparatus in execution S1030. In this case, the processor may correct the quality information related to the quality of a material generated by the corrected 3D model apparatus based on the calculated value corresponding to each of the plurality of quality parameters S1040.

Then, the processor may determine whether one or more defect scenarios have been resolved using the corrected quality information and/or the setting values and condition values of the 3D model apparatus S1050. When it is determined that the defect scenario has not been resolved, the processor may again generate or obtain the second user action information and the second user condition information using the information input by the user.

When it is determined that one or more defect scenarios have been resolved, while one or more defect scenarios are in progress, the processor may calculate a progress time and a loss value of one or more defect scenarios S1060. Also, the processor may generate operational capability information for the 3D model apparatus of the user account based on the calculated progress time and loss value S1070. Here, the operational capability information may include, but is not limited to, a progress speed and accuracy calculated using the progress time and the loss value and may further include the user's test score and whether the user has passed the test. In this case, one user account may be assigned to each user performing secondary battery production; the operational capability information generated based on the user's defect scenario progress time and loss value may be stored or managed in conjunction with the user account.

Figure 11:
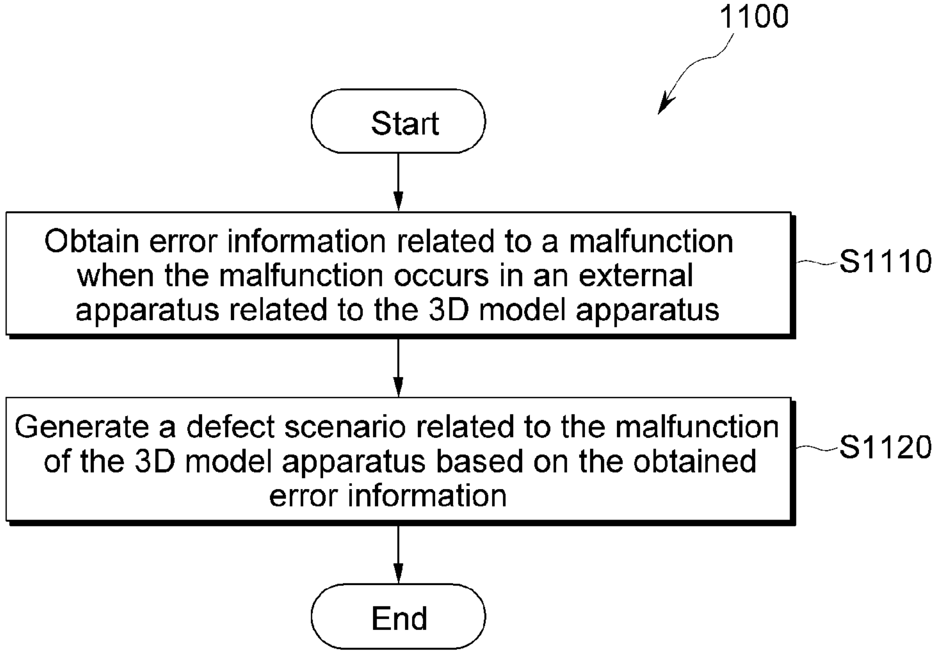
FIG. 11 illustrates an example of a method for generating a defect scenario according to one embodiment of the present disclosure.

FIG. 11 illustrates an example of a method for generating a defect scenario 1100 according to one embodiment of the present disclosure. The method for generating a defect scenario 1100 may be performed by a processor (e.g., at least one processor of a simulation apparatus). As shown in the figure, the method for generating a defect scenario 1100 may be initiated as the processor obtains error information related to a malfunction when the malfunction occurs in an external apparatus related to the 3D model apparatus S1110.

The processor may generate a defect scenario related to a malfunction of the 3D model apparatus based on the obtained error information S1120. Here, the error information may include each adjustment parameter value and setting values of actual secondary battery production equipment related to the 3D model apparatus, obtained when the corresponding production equipment malfunctions. For example, when the quality of a material generated by secondary battery production equipment gets out of a predetermined normal range, it may be determined that a malfunction has occurred; when it is determined that a malfunction has occurred, the processor may obtain error information related to the malfunction and generate a defect scenario related to the malfunction of the 3D model apparatus based on the obtained error information.

Figure 12:
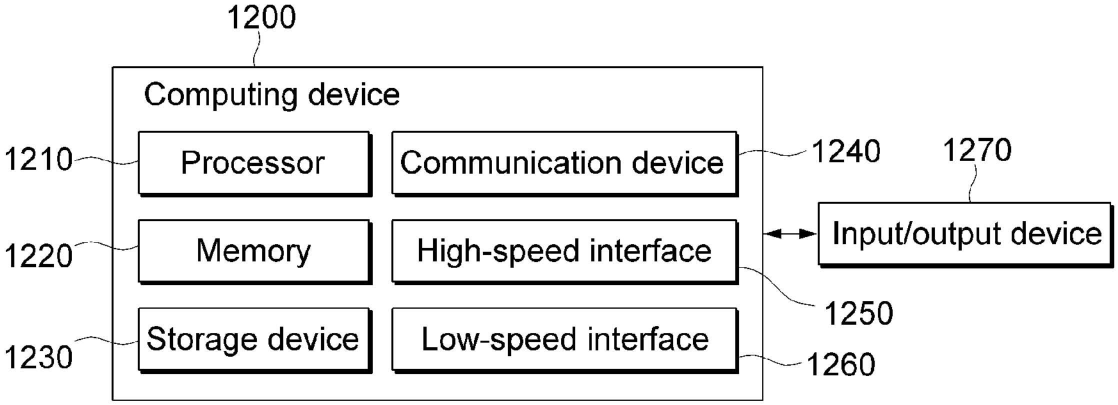
FIG. 12 illustrates an exemplary computing device for performing the method and/or embodiments.

FIG. 12 illustrates an exemplary computing device 1200 for performing the method and/or embodiments. According to one embodiment, the computing device 1200 may be implemented using hardware and/or software configured to interact with a user. Here, the computing device 1200 may include the simulation apparatus (100 of FIG. 1). For example, the computing device 1200 may be configured to support virtual reality (VR), augmented reality (AR), or mixed reality (MR) environments but is not limited thereto. The computing device 1200 may include a laptop computer, a desktop computer, a workstation, a personal digital assistant, a server, a blade server, and a mainframe computer, which is not limited thereto. The constituting elements of the computing device 1200 and connection relationships and functions of the constituting elements are intended to be illustrative and not intended to limit the implementations of the present disclosure described and/or claimed herein.

The computing device 1200 includes a processor 1210, a memory 1220, a storage device 1230, a communication device 1240, a high-speed interface 1250 connected to the memory 1220 and a high-speed expansion port, and a low-speed interface 1260 connected to a low-speed bus and a low-speed storage device. Each of the constituting elements 1210, 1220, 1230, 1240, 1250 may be interconnected using a variety of buses, mounted on the same main board, or mounted and connected in other suitable ways. The processor 1210 may be configured to process instructions of a computer program by performing basic arithmetic, logic, and input/output operations. For example, the processor 1210 may process instructions stored in the memory 1220 and the storage device 1230 and/or instructions executed within the computing device 1200 and display graphic information on an external input/output device 1270 such as a display device combined with the high-speed interface 1250.

The communication device 1240 may provide a configuration or a function for the input/output device 1270 and the computing device 1200 to communicate with each other through a network and provide a configuration or a function to support the input/output device 1270 and/or the computing device 1200 to communicate with another external apparatus. For example, a request or data generated by the processor of the external apparatus according to an arbitrary program code may be transmitted to the computing device 1200 through a network under the control of the communication device 1240. Conversely, a control signal or a command provided under the control of the processor 1210 of the computing device 1200 may be transmitted to another external device through the communication device 1240 and a network.

FIG. 12 assumes that the computing device 1200 includes one processor 1210 and one memory 1220, but the present disclosure is not limited to the assumption; the computing device 1200 may be implemented using a plurality of memories, a plurality of processors, and/or a plurality of buses. Also, although FIG. 12 assumes that one computing device 1200 is employed, the present disclosure is not limited to the assumption, and a plurality of computing devices may interact with each other and perform operations required to execute the method described above.

The memory 1220 may store information in the computing device 1200. According to one embodiment, the memory 1220 may include a volatile memory unit or a plurality of memory units. Additionally or alternatively, the memory 1220 may be composed of a non-volatile memory unit or a plurality of memory units. Also, the memory 1220 may be implemented using a different type of computer-readable medium, such as a magnetic disc or an optical disc. Also, an operating system and at least one program code and/or instruction may be stored in the memory 1220.

The storage device 1230 may be one or more mass storage devices for storing data for the computing device 1200. For example, the storage device 1230 may be configured to include a hard disc; a magnetic disc such as a portable disc; an optical disc; a semiconductor memory device such as an erasable programmable read-only memory (EPROM), an electrically erasable PROM (EEPROM), and a flash memory; and a computer-readable medium including a CD-ROM or DVD-ROM disc; or the storage device 1230 may be configured to include the computer-readable medium. Also, the computer program may be implemented tangibly in the computer-readable medium.

The high-speed interface 1250 and the low-speed interface 1260 may be used for interaction with the input/output device 1270. For example, an input device may include a camera including an audio sensor and/or an image sensor, a keyboard, a microphone, and a mouse; an output device may include a display, a speaker, and a haptic feedback device. In another example, the high-speed interface 1250 and the low-speed interface 1260 may be used for interfacing with a device in which a configuration or function for performing input and output operations is integrated into one entity, such as a touch screen.

According to one embodiment, the high-speed interface 1250 manages bandwidth-intensive operations for the computing device 1200, while the low-speed interface 1260 manages less bandwidth-intensive operations than the high-speed interface 1250, where the above functional assignment has been made merely for an illustrative purpose. According to one embodiment, the high-speed interface 1250 may be coupled to high-speed expansion ports capable of accommodating the memory 1220, the input/output device, and various expansion cards (not shown). Also, the low-speed interface 1260 may be coupled to the storage device 1230 and low-speed expansion ports. Additionally, the low-speed expansion port, which may include various communication ports (e.g., USB, Bluetooth, Ethernet, and wireless Ethernet), may be coupled to one or more input/output devices 1270, such as a keyboard, a pointing device, and a scanner, or a networking device, such as a router or a switch, through a network adaptor.

The computing device 1200 may be implemented in many different forms. For example, the computing device 1200 may be implemented as a standard server or a group of standard servers. Additionally or alternatively, the computing device 1200 may be implemented as part of a rack server system or may be implemented as a personal computer, such as a laptop computer. In this case, constituting elements from the computing device 1200 may be combined with other constituting elements of an arbitrary mobile device (not shown). The computing device 1200 may include one or more other computing devices or may be configured to communicate with one or more computing devices.

FIG. 12 assumes that the input/output device 1270 is not included in the computing device 1200, but the present disclosure is not limited to the assumption; the input/output device 1270 may be configured to be integrated into the computing device 1200 to form a single device. Also, FIG. 12 illustrates that the high-speed interface 1250 and/or the low-speed interface 1260 are illustrated as being configured separately from the processor 1210; however, the present disclosure is not limited thereto, and the high-speed interface 1250 and/or the low-speed interface 1260 may be configured to be included in the processor 1210.

The method and/or various embodiments described above may be implemented in digital electronic circuitry, computer hardware, firmware, software, and/or a combination thereof. Various embodiments of the present disclosure may be executed by a data processing device, for example, one or more programmable processors and/or one or more computing devices; or implemented as a computer-readable medium and/or a computer program stored on a computer-readable medium. The computer program may be written in any form of programming language including a compiled language or an interpreted language and may be distributed in any form such as a stand-alone program, a module, or a subroutine. The computer program may be distributed via a plurality of computing devices connected through one computing device and the same network and/or a plurality of distributed computing devices connected through a plurality of different networks.

The method and/or various embodiments described above may be performed by one or more processors configured to execute one or more computer programs that process, store, and/or manage arbitrary functions by operating based on input data or generating output data. For example, the method and/or various embodiments of the present disclosure may be performed by a special-purpose logic circuit such as a Field Programmable Gate Array (FPGA) or an Application Specific Integrated Circuit (ASIC); an apparatus and/or a system for performing the method and/or various embodiments of the present disclosure may be implemented as a special-purpose logic circuit such as an FPGA or an ASIC.

The one or more processors executing the computer program may include a general-purpose or special-purpose microprocessor and/or one or more processors of an arbitrary type of digital computing device. The processor may receive instructions and/or data from each of the read-only memory and the random-access memory or may receive instructions and/or data from the read-only memory and the random-access memory. In the present disclosure, the constituting elements of a computing device performing the method and/or embodiments may include one or more processors for executing instructions; and one or more memories for storing instructions and/or data.

According to one embodiment, the computing device may send and receive data to and from one or more mass storage devices for storing data. For example, the computing device may receive data from a magnetic or optical disc and transmit data to the magnetic or optical disc. A computer-readable medium suitable for storing instructions and/or data related to a computer program may include any form of non-volatile memory including a semiconductor memory device such as an Erasable Programmable Read-Only Memory (EPROM), an Electrically Erasable PROM (EEPROM), and a flash memory device; however, the present disclosure is not limited thereto. For example, a computer-readable medium may include a magnetic disc such as an internal hard disc or a removable disc, a photomagnetic disk, a CD-ROM disc, and a DVD-ROM disc.

To provide interaction with a user, the computing device may include a display device (e.g., a cathode ray tube (CRT) or a liquid crystal display (LCD)) for providing or displaying information to the user and a pointing device (e.g., a keyboard, a mouse, or a trackball) through which the user may provide input and/or commands to the computing device by the user; however, the present disclosure is not limited to the specific example above. In other words, the computing device may further include any other kind of device for providing interaction with the user. For example, the computing device may provide any form of sensory feedback to the user for interaction with the user, including visual feedback, auditory feedback, and/or tactile feedback. In response to the feedback, the user may provide input to the computing device through various gestures including a visual expression, voice, and motion.

In the present disclosure, various embodiments may be implemented in a computing device that includes a back-end component (e.g., a data server), a middleware component (e.g., an application server), and/or a front-end component. In this case, the constituting elements may be interconnected by any form or any medium of digital data communication, such as a communication network. According to one embodiment, the communication network includes a wired network such as Ethernet, a wired home network (Power Line Communication), a telephone line communication device, and RS-serial communication; a wireless network such as a mobile communication network, a wireless LAN (WLAN), Wi-Fi, and Bluetooth; or a combination of the wired and wireless networks. For example, the communication network may include a local area network (LAN) and a wide area network (WAN).

A computing device based on the illustrative embodiments described herein may be implemented using hardware and/or software configured to interact with a user, including a user device, a user interface (UI) device, a user terminal, or a client device. For example, the computing device may include a portable computing device such as a laptop computer. Additionally or alternatively, the computing device may include a Personal Digital Assistants (PDA), a tablet PC, a game console, a wearable device, an Internet of Things (IoT) device, a virtual reality (VR) device, and an augmented reality (AR) device but is not limited thereto. The computing device may further include other types of devices configured to interact with the user. Also, the computing device may include a portable communication device (e.g., a mobile phone, a smartphone, or a wireless cellular phone) suitable for wireless communication over a network, such as a mobile communication network. The computing device may be configured to communicate wirelessly with a network server using wireless communication technologies and/or protocols such as Radio Frequency (RF), Microwave Frequency (MWF), and/or Infrared Ray Frequency (IRF).

Various embodiments of the present disclosure, including specific structural and functional details, are illustrative in nature. Accordingly, the embodiments of the present disclosure are not limited to those described above and may be implemented in various other forms. Also, the terms used in the present disclosure are intended for describing part of embodiments and should not be construed as limiting the embodiments. For example, singular words and the descriptions above may be construed to include plural forms unless the context dictates otherwise.

Unless defined otherwise, terms used in the present disclosure, including technical or scientific terms, may convey the same meaning understood generally by those skilled in the art to which the present disclosure belongs. Among the terms used in the present disclosure, commonly used terms, such as those defined in ordinary dictionaries, should be interpreted to convey the same meaning in the context of related technology.

The present disclosure has been described with reference to particular embodiments; however, various modifications and changes may be made without departing from the technical scope of the present disclosure that may be understood by those skilled in the art to which the present disclosure belongs. Also, it should be understood that the modifications and changes fall within the technical scope of the appended claims.

What is claimed is:

1. A simulation method for secondary battery production performed by at least one processor, the method comprising:

executing an apparatus operating unit including a 3D model apparatus related to secondary battery production, a facility operating unit including a plurality of adjustment parameters for determining operation of the 3D model apparatus, and a quality checking unit including quality information related to quality of a material produced by the 3D model apparatus, receiving at least one of first user action information obtained through the apparatus operating unit or first user condition information obtained through the facility operating unit, determining an operation of the 3D model apparatus based on at least one of the first user action information or the first user condition information obtained, executing the operation of the 3D model apparatus included in the apparatus operating unit based on the determined operation, determining one or more defect scenarios among a plurality of defect scenarios related to malfunction of the 3D model apparatus;

modifying at least one of the operation of the 3D model apparatus or the quality information related to the quality of the material based on the determined one or more defect scenarios, receiving at least one of second user action information obtained through the apparatus operating unit or second user condition information obtained through the facility operating unit for resolving the determined one or more defect scenarios;

correcting the modified operation of the 3D model apparatus based on at least one of the received second user action information or the received second user condition information;

calculating a value corresponding to each of one or more quality parameters related to the quality of the material produced by the 3D model apparatus based on the operation of the 3D model apparatus being executed, while the corrected operation of the 3D model apparatus is in execution;

correcting the quality information related to the quality of the material produced by the corrected 3D model apparatus based on the calculated value corresponding to each of the one or more quality parameters; and determining whether the one or more defect scenarios are resolved based on the corrected quality information.

2. The method of claim 1, further comprising:

determining, when the first user action information is received, whether the received first user action information corresponds to a predetermined operating condition of the 3D model apparatus, and approving the operation of the 3D model apparatus when it is determined that the first user action information corresponds to the predetermined operating condition of the 3D model apparatus.

3. The method of claim 1, further comprising:

determining one or more quality parameters for determining the quality of the material produced by the 3D model apparatus;

calculating a value corresponding to each of the determined one or more quality parameters based on the operation of the 3D model apparatus being executed while the operation of the 3D model apparatus is in execution; and generating quality information related to the quality of the material produced by the 3D model apparatus based on the calculated value corresponding to each of the one or more quality parameters.

4. The method of claim 1, further comprising:

upon determining that the one or more defect scenarios are resolved, calculating a progress time and a loss value of the one or more defect scenarios while the one or more defect scenarios are in progress; and generating operational capability information of a user account for the 3D model apparatus based on the calculated progress time and loss value.

5. The method of claim 1, further comprising:

outputting guide information including condition information and action information required to resolve the one or more defect scenarios.

6. The method of claim 1, further comprising:

obtaining, when a malfunction occurs in an external device associated with the 3D model apparatus, error information related to the malfunction; and generating a defect scenario related to the malfunction of the 3D model apparatus based on the obtained error information.

7. The method of claim 1, wherein the first user condition information includes information associated with a value corresponding to at least one adjustment parameter included in the plurality of adjustment parameters.

8. A non-transitory computer-readable medium storing instructions for executing a simulation for secondary battery production, the instructions, when executed by one or more processors, causing the one or more processors to perform operations comprising:

executing an apparatus operating unit including a 3D model apparatus related to secondary battery production, a facility operating unit including a plurality of adjustment parameters for determining operation of the 3D model apparatus, and a quality checking unit including quality information related to quality of a material produced by the 3D model apparatus, receiving at least one of first user action information obtained through the apparatus operating unit or first user condition information obtained through the facility operating unit, determining an operation of the 3D model apparatus based on at least one of the first user action information or the first user condition information obtained, executing the operation of the 3D model apparatus included in the apparatus operating unit based on the determined operation, determining one or more defect scenarios among a plurality of defect scenarios related to malfunction of the 3D model apparatus;

modifying at least one of the operation of the 3D model apparatus or the quality information related to the quality of the material based on the determined one or more defect scenarios, receiving at least one of second user action information obtained through the apparatus operating unit or second user condition information obtained through the facility operating unit for resolving the determined one or more defect scenarios;

correcting the modified operation of the 3D model apparatus based on at least one of the received second user action information or the received second user condition information;

calculating a value corresponding to each of one or more quality parameters related to the quality of the material produced by the 3D model apparatus based on the operation of the 3D model apparatus being executed, while the corrected operation of the 3D model apparatus is in execution;

correcting the quality information related to the quality of the material produced by the corrected 3D model apparatus based on the calculated value corresponding to each of the one or more quality parameters; and determining whether the one or more defect scenarios are resolved based on the corrected quality information.

9. A simulation apparatus for secondary battery production, the simulation apparatus comprising:

a memory configured to store at least one instruction; and at least one processor configured to execute the at least one instruction stored in the memory to perform operations comprising:

executing an apparatus operating unit including a 3D model apparatus related to secondary battery production, a facility operating unit including a plurality of adjustment parameters for determining operation of the 3D model apparatus, and a quality checking unit including quality information related to quality of a material produced by the 3D model apparatus, receiving at least one of first user action information obtained through the apparatus operating unit or first user condition information obtained through the facility operating unit, determining an operation of the 3D model apparatus based on at least one of the first user action information or the first user condition information obtained, executing the operation of the 3D model apparatus included in the apparatus operating unit based on the determined operation, determining one or more defect scenarios among a plurality of defect scenarios related to malfunction of the 3D model apparatus;

modifying at least one of the operation of the 3D model apparatus or the quality information related to the quality of the material based on the determined one or more defect scenarios, receiving at least one of second user action information obtained through the apparatus operating unit or second user condition information obtained through the facility operating unit for resolving the determined one or more defect scenarios;

correcting the modified operation of the 3D model apparatus based on at least one of the received second user action information or the received second user condition information;

calculating a value corresponding to each of one or more quality parameters related to the quality of the material produced by the 3D model apparatus based on the operation of the 3D model apparatus being executed, while the corrected operation of the 3D model apparatus is in execution;

correcting the quality information related to the quality of the material produced by the corrected 3D model apparatus based on the calculated value corresponding to each of the one or more quality parameters; and determining whether the one or more defect scenarios are resolved based on the corrected quality information.

10. The apparatus of claim 9, wherein the operations further comprise:

determining, when the first user action information is received, whether the received first user action information corresponds to a predetermined operating condition of the 3D model apparatus, and approving the operation of the 3D model apparatus when it is determined that the first user action information corresponds to the predetermined operating condition of the 3D model apparatus.

11. The apparatus of claim 9, wherein the operations further comprise:

determining one or more quality parameters for determining the quality of the material produced by the 3D model apparatus;

calculating a value corresponding to each of the determined one or more quality parameters based on the operation of the 3D model apparatus being executed while the operation of the 3D model apparatus is in execution; and generating quality information related to the quality of the material produced by the 3D model apparatus based on the calculated value corresponding to each of the one or more quality parameters.

12. The apparatus of claim 11, wherein the operations further comprise:

upon determining that the one or more defect scenarios are resolved, calculating a progress time and a loss value of the one or more defect scenarios while the one or more defect scenarios are in progress; and generating operational capability information of a user account for the 3D model apparatus based on the calculated progress time and loss value.

13. The apparatus of claim 9, wherein the operations further comprise:

outputting guide information including condition information and action information required to resolve the one or more defect scenarios.

14. The apparatus of claim 9, wherein the operations further comprise:

obtaining, when a malfunction occurs in an external device associated with the 3D model apparatus, error information related to the malfunction; and generating a defect scenario related to the malfunction of the 3D model apparatus based on the obtained error information.

15. The apparatus of claim 9, wherein the first user condition information includes information associated with a value corresponding to at least one adjustment parameter included in the plurality of adjustment parameters.

* * * * *